US011200786B1

(12) United States Patent
Madden

(10) Patent No.: US 11,200,786 B1
(45) Date of Patent: Dec. 14, 2021

(54) CANINE ASSISTED HOME MONITORING

(71) Applicant: ObjectVideo Labs, LLC, Tysons, VA (US)

(72) Inventor: Donald Madden, Columbia, MD (US)

(73) Assignee: ObjectVideo Labs, LLC, Tysons, VA (US)

( * ) Notice: Subject to any disclaimer, the term of this patent is extended or adjusted under 35 U.S.C. 154(b) by 140 days.

(21) Appl. No.: 16/380,291

(22) Filed: Apr. 10, 2019

Related U.S. Application Data

(60) Provisional application No. 62/657,171, filed on Apr. 13, 2018.

(51) Int. Cl.
*G08B 13/22* (2006.01)
*A01M 31/00* (2006.01)
*A01K 29/00* (2006.01)

(52) U.S. Cl.
CPC .......... *G08B 13/22* (2013.01); *A01K 29/005* (2013.01); *A01M 31/002* (2013.01)

(58) Field of Classification Search
CPC ....... G08B 13/22; A01K 29/005; A01M 31/00
See application file for complete search history.

(56) References Cited

U.S. PATENT DOCUMENTS

| 9,743,643 | B1* | 8/2017 | Kaplan | A01K 27/009 |
|---|---|---|---|---|
| 10,535,364 | B1* | 1/2020 | Zhong | H04R 1/02 |
| 2015/0244980 | A1 | 8/2015 | Matthews | |
| 2016/0125318 | A1 | 5/2016 | Scoffier et al. | |
| 2018/0125038 | A1* | 5/2018 | Hord | G08B 13/1672 |
| 2018/0227676 | A1* | 8/2018 | Glavin | H04R 25/356 |

* cited by examiner

*Primary Examiner* — Quan-Zhen Wang
*Assistant Examiner* — Mancil Littlejohn, Jr.
(74) *Attorney, Agent, or Firm* — Fish & Richardson P.C.

(57) ABSTRACT

Methods, systems, and apparatus, including computer programs encoded on a computer storage medium, for canine assisted home monitoring. The methods, systems, and apparatus include actions of: obtaining a reference signal from an animal at a property; determining whether an event occurred at the property corresponding to when the reference signal from the animal was received; in response to a determination that the event occurred at the property corresponding to when the reference signal from the animal was received, determining that the reference signal indicates that the event is likely occurring at the property; obtaining a sample signal from the animal at the property; determining whether the sample signal corresponds to the reference signal; and notifying a user that the event, which was determined to be indicated by the reference signal, is likely occurring again at the property.

20 Claims, 6 Drawing Sheets

CANINE ASSISTED HOME MONITORING

CROSS REFERENCE TO RELATED APPLICATIONS

This application claims benefit of U.S. Provisional Application No. 62/657,171, filed on Apr. 13, 2018, titled "Canine Assisted Home Monitoring," which is incorporated by reference in its entirety.

TECHNICAL FIELD

This disclosure relates generally to monitoring systems, and more particularly, to monitoring systems assisted by signals from an animal.

BACKGROUND

A monitoring system for a property can include various components including sensors, cameras, and other devices. A user can configure the monitoring system, for example, by placing components and defining monitoring rules for an object.

Humans sometimes rely on animals (e.g., a dog, a cat, etc.) that has keen senses and instincts as guards and sentries for their homes and businesses. For instance, a dog can hear a sound of an object (e.g., a visitor) approaching a property from a long distance. In some cases, when a dog notices an unusual object such as a stranger at the property, it may move to get a better view of the object and vocalize toward the object.

SUMMARY

Techniques are described for canine assisted monitoring technology. For example, techniques are described for processes determining a type of signal related to a behavior of an animal at a monitored property based on analysis of signals captured by one or more sensing devices configured to detect signals from the animal such as a sound or a motion of the animal.

In some implementations, a system may perform an action based on predetermined rules related to a behavior of an animal. For example, the system may notify a user if a sample sound from an animal corresponds to a reference sound that has been learned based on prior barks of the animal and events corresponding to the barks. In some implementations, the system may trigger an action based on classification of signals from an animal. For example, the system may deter a potential intruder from entering a monitored property.

According to one aspect of the subject matter described in this application, a computer-implemented method includes: obtaining a reference signal from an animal at a property; determining whether an event occurred at the property corresponding to when the reference signal from the animal was received; in response to determining that the event occurred at the property corresponding to when the reference signal from the animal was received, determining that the reference signal indicates that the event is likely occurring at the property; obtaining a sample signal from the animal at the property; determining whether the sample signal corresponds to the reference signal; and in response to determining that the sample signal corresponds to the reference signal, notifying a user that the event, which was determined to be indicated by the reference signal, is likely occurring again at the property.

Implementations according to this aspect may include one or more of the following features. For example, determining whether the sample signal corresponds to the reference signal may include determining whether one or more of a pitch, duration, or number of peaks of a first sound represented by the sample signal match one or more of a pitch, duration, or number of peaks of a second sound represented by the reference signal. In some examples, determining whether the sample signal corresponds to the reference signal may include determining whether movement of the animal shown in the reference signal matches movement of the animal shown in the sample signal.

In some implementations, determining whether the event occurred at the property corresponding to when the reference signal from the animal was received may include: obtaining sensor signals from one or more sensors installed at the property; and based on the sensor signals, determining that an unknown user was located at the property when the reference signal from the animal was received. In some examples, determining that the reference signal indicates that the event is likely occurring at the property may include, based on determining that the unknown user was located at the property when the reference signal from the animal was received, determining that the reference signal indicates that an unknown user is likely at the property.

In some implementations, the method may further include, in response to determining that the sample signal corresponds to the reference signal, providing the sample signal from the animal to a speaker. In some implementations, obtaining the reference signal from the animal at the property may include obtaining a sensor signal from a sensor carried by the animal, the sensor signal including at least one of an audio signal of the animal, location information of the animal, movement information of the animal, or an image or video of areas of the property captured by the sensor carried by the animal.

In some implementations, determining whether the sample signal corresponds to the reference signal may include: determining one or more reference parameters from the reference signal corresponding to emotions of the animal; comparing one or more parameters of the sample signal to the one or more reference parameters, respectively; and based on the comparison of the one or more parameters of the sample signal to the one or more reference parameters, respectively, determining whether the sample signal corresponds to the reference signal.

In some implementations, the method may further include determining a correlation value between the sample signal and the reference signal. In the same or other implementations, determining whether the sample signal corresponds to the reference signal may include determining that the sample signal corresponds to the reference signal based on the correlation value being greater than a threshold value.

In some implementations, the method may further include, in response to determining that the event occurred at the property corresponding to when the reference signal from the animal was received, increasing an accuracy score indicating that the event is likely occurring at the property. In the same or other implementations, notifying the user that the event may include, based on the accuracy score of the reference signal being greater than a threshold score, notifying the user that the event is likely occurring again at the property.

Implementations of the described techniques may include hardware, a method or process implemented at least partially in hardware, or a computer-readable storage medium encoded with executable instructions that, when executed by one or more processors, perform operations.

The details of one or more implementations are set forth in the accompanying drawings and the description below. Other features will be apparent from the description and drawings, and from the claims.

BRIEF DESCRIPTION OF DRAWINGS

Like reference symbols in the various drawings indicate like elements.

DETAILED DESCRIPTION

Techniques are described for detecting a signal from an animal, for determining a type of the detected signal and an event corresponding to the detected signal, and for providing information related to the event based on results of analysis of the detected signal. For instance, a canine assisted monitoring system may capture a signal from a dog, and utilize the signal to control other components (e.g., cameras, transceivers) of the monitoring system.

Figure 1:
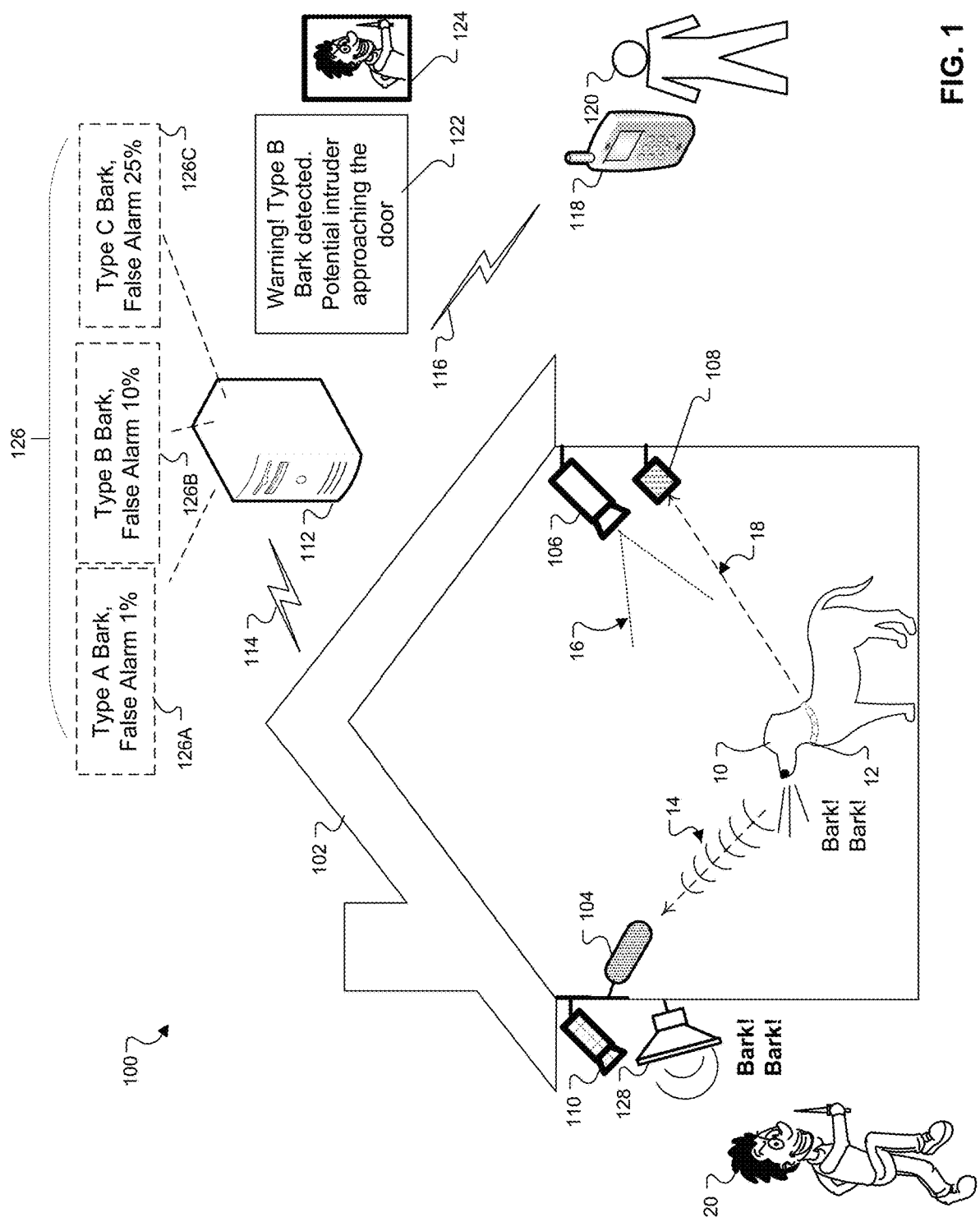
FIG. 1 illustrates an example of a canine assisted monitoring system.

FIG. 1 illustrates an example monitoring system 100 that monitors a property 102 based on a signal received from an animal 10. For example, the animal 10 is a dog located inside of the property 102. The monitoring system 100 includes one or more sensing devices 104, 106, and 108 that are configured to detect signals from the animal 10, a camera 110 that captures an image or video of an area of the property 102 or an image or video of an object around the property 102, and a controller 112. The controller 112 obtains signals 14, 16, 18 from the animal 10, that processes the signals 14, 16, and 18, and provides information 122 to a user 120 based on results of analysis of the signals 14, 16, 18. The controller 112 may store reference signals 126 corresponding to a type of signal of the animal 10 and analyze the signals 14, 16, 18 using the reference signals 126. The monitoring system 100 further includes communication links 114 and 116 configured to transmit information corresponding to the signals 14, 16, and 18 and results of analysis of the signals.

The one or more sensing devices may include an audio sensor 104 (e.g., a microphone) configured to detect a sound from an object inside or outside of the property 102. For example, the audio sensor 104 may be installed at an inside of the property 102 and configured to detect a sound 14 (e.g., a dog bark) from the animal 10. In some implementations, the audio sensor 104 may include a plurality of audio sensors that are arranged in the property 102 to determine a location of the animal 10 based on the obtained sound 14 received at the plurality of audio sensors, or to detect sounds coming from a plurality of areas at the property 102. In some examples, a detection range covered by the audio sensor 104 (e.g., the plurality of audio sensors) may be greater than a detection range covered by an imaging sensor 106. For instance, the audio sensor 104 may detect a sound from the animal 10 that is located outside of the detection range of the imaging sensor 106 because a structure in the property 102 blocks a field of view of the imaging sensor 106. The audio sensor 104 may be powered by a battery (e.g., a rechargeable battery, a consumable battery), an electrical outlet (e.g., a wall outlet), or both.

The one or more sensing devices may further include an imaging sensor 106 (e.g., a camera) configured to capture an image, images, or a video. For example, the imaging sensor 106 may include a still camera, a video camera, a camcorder, an action camera, a stereo camera, a surveillance camera, etc. The imaging sensor 106 may pan, zoom, and/or tilt to capture an image of an area of the property 102 or objects (e.g., structures, animals, humans) in the property 102. For instance, the imaging sensor 106 may be installed at an appropriate location(s) of the property (e.g., an inside of the property 102, an outside of the property 102) to capture an image of the animal 10 in the property 102 and track movement of the animal 10. In some examples, the imaging sensor 106 may include a lighting device that assists in capturing of images at low light conditions (e.g., at night, in shade, etc.). The imaging sensor 106 may be powered by a battery (e.g., a rechargeable battery, a consumable battery), an electrical outlet (e.g., a wall outlet), or both.

In some implementations where the animal 10 carries a wearable device 12, for example, at a collar or a vest of the animal 10. The one or more sensing devices may include a signal detector 108 (e.g., a radio signal detector) configured to receive a signal from the wearable device 12. For example, the signal detector 108 may detect a location of the animal 10 in the property 102 based on an identification signal (e.g., a radio-frequency identification (RFID) tag) from the wearable device 12. In some implementations, the signal detector 108 may obtain an audio signal from the wearable device 12 to detect vocalization of the animal 10. In some implementations where the wearable device 12 includes an imaging device (e.g., a fish-eye camera) configured to capture an image of an object at an animal 10's attention, the signal detector 108 may receive an image from the wearable device 12. In some cases, a quality level of images captured by the fish-eye camera may be less than a quality level of images taken by the imaging sensor 106. In other cases, a quality level of images captured by the fish-eye camera may exceed a quality level of images taken by the imaging sensor 106

In some examples, the one or more sensing devices 104, 106, and 108 may be on board of one sensing device. For instance, one sensing device may include a microphone and a camera, or a microphone and an RFID detector, a camera and an RFID detector, or all. In other examples, the one or more sensing devices 104, 106, and 108 may be separately provided. For example, the audio sensor 104 may be a smart audio receiver that is configured to be controlled by a voice of a user and that is located at a first location of the property 102, while the imaging sensor 106 may be a surveillance camera installed at a second location of the property 102 that is different from the first location.

The camera 110 may include various types of imaging devices that can capture an image, images, or a video. For example, the camera 110 may include a still camera, a video camera, a camcorder, an action camera, a stereo camera, a surveillance camera, etc. The camera 110 may be powered by a battery (e.g., a rechargeable battery, a consumable battery), an electrical outlet (e.g., a wall outlet), or both. The camera 110 may pan, zoom, and/or tilt to capture an image of an area of the property 102 or an object (e.g., a stranger 20) at the property 102. For instance, the camera 110 may be installed at an appropriate location(s) of the property (e.g., an inside of the property 102, an outside of the property 102) to capture an image of the stranger 20 outside of the property 102 and track movement of the stranger 20. In some examples, the camera 110 may include a lighting device that assists in capturing of images at low light conditions (e.g., at night, in shade, etc.).

In some implementations, the camera 110 may include a plurality of cameras that are installed at multiple locations of the property 102 to capture images of a plurality of areas of the property 102 or to capture images of an area of the property 102 from a plurality of directions. For example, a first camera may capture an image or video of the stranger 20 from a first side of the property 102, and a second camera capture an image or video of the stranger 20 from a second side of the property 102 that is different from the first side. In some examples, some of the plurality of cameras that have better visibility for the stranger 20 than another camera of the plurality of cameras may be controlled to capture an image of the stranger 20.

The controller 112 may be one or more processors on board of the one or more of the sensing devices 104, 106, 108 or the camera 110, a computer or server in the property 102, or a cloud server located outside of the property 102. The controller 112 obtains signals 14, 16, and 18 detected by the audio sensor 104, the imaging sensor 106, and the signal detector 108, respectively, analyzes the signals 14, 16, and 18, and provides a user 120 with information 122 related to results of analysis of the signals 14, 16, and 18. For example, the controller 112 may obtain, from the audio sensor 104, a sound signal corresponding to the sound 14 from the animal 10 over the communication link 114.

The animal 10 may make sounds with different patterns/pitches corresponding to different emotions such as distress, alarm, aggression, greeting, etc. In some implementations, the controller 112 may include a learning algorithm that aggregates the sounds of the animal 10 obtained from the audio sensor 104 and that determines an emotion of the animal corresponding to the sounds. For example, the controller 112 may include an artificial neural network that can be trained with a wide variety of sounds from the animal 10. In some examples, each sound may be assigned to a label in the neural network corresponding to an emotion of the animal 10. For example, a bark from the animal 10 may be assigned to bark type A corresponding to aggression, while a bark from the animal 10 may be assigned to bark type B corresponding to distress. In some implementations, the controller 112 may train the neural network for multiple animals or multiple breeds (e.g., breeds of dogs) based on sounds from each animal or breed.

In some implementations, the controller 112 may determine, based on various sounds of an animal 10, a classifier that can identify an emotion of the animal 10 corresponding to a sound of the animal 10. For example, the controller 112 may utilize one or more of a pitch of bark, a duration of bark, a number of barks, or other characteristics of barks as the classifier to identify an emotion of the animal 10 corresponding to the barks of the animal 10. For instance, the controller 112 may recognize that the animal 10 makes barks in an aggression state for a number of barks (e.g., 5-7 times) that is greater than a number of barks corresponding to greeting (e.g., 1 or 2 times).

In some implementations, the controller 112 may determine a location of the animal 10 based on multiple audio sensors installed at various locations in the property 102. In some examples where the controller 112 includes information related to locations of the multiple sensors and a map of the property 102, the controller 112 may determine a location of the animal 10 (e.g., a position of a dog) based on an amplitude of bark received at each audio sensor. For example, if amplitudes of barks detected at three audio sensors are equal to one another, the animal 10 may be located at a positon corresponding to a center of a triangle that connects the three audio sensors.

Alternatively or additionally, the controller 112 may use other information to determine a location of the animal 10 such as an arrival time of the sound at each audio sensor. In some examples, the controller 112 may leverage information from smart speakers or other sensors that constitute an acoustic model of an environment of the property 102 with a microphone array to further localize the location of the animal 10. For example, the acoustic model of the environment of the property 102 may include information regarding absorption of sound at an area (e.g., behind a thick wall) of the property 102, which affects determination of the location of the animal 10 based on an amplitude of bark.

When the controller 112 determines a location of the animal 10 based on the sound 14 detected by the audio sensor 104, the controller 112 may further control other components (e.g., camera 110) of the system 100 to verify that the sound 14 corresponds to an event. For example, based on a determination that the animal 10 barks at a front foyer of the property 102, the controller 112 may control (e.g., pan/tilt) an outdoor camera 110 to view an area around a front door to find out whether an object (e.g., a stranger 20) is located at an outside of the front door. In some examples, the controller 112 controls the camera 110 or additional cameras to capture additional images or videos of the area around the front door and to transmit the images or videos to the controller 112. The controller 112 analyzes the received images and videos to verify whether the animal 10 detected the stranger 20.

In some implementations, the controller 112 may control cameras or sensors that monitor other areas of the property 102 than the front door to determine that the animal 10 may indicate events occurred the other areas of the property 102. For example, based on a determination that the animal is barking at a front foyer of the property 102, the controller 112 controls (e.g., pan/tilt) an outdoor camera 110 to view an area around a garage or a street to detect an object (e.g., a vehicle driven by the stranger 20) outside of the property 102. In some cases, the controller 112 may control the camera 110 or other cameras to capture images of various areas of the property based on a lack of detection of an object outside of the property 102. For example, if the camera 110 does not detect any object at the front door, the controller 112 may pan/tilt the camera 110 or trigger other cameras to search objects located at other locations of the property 102.

In some examples where multiple animals make sounds from a multiple locations in the property 102, the controller 112 may control one or more cameras to capture images of areas at one or more locations of the property 102. For example, the controller 112 may obtain images from all the cameras corresponding to the multiple locations. In other examples, the controller 112 may select one or more of the cameras based on a predetermined condition such as an accuracy score of each animal, a security risk level of each location, or a remaining power level of each camera. For example, when a first dog barks at a front foyer and a second dog barks at a back yard, the controller 112 may select first one or more cameras viewing a front door area that has a higher security risk level than a back yard area. In this example, if the second dog has a higher accuracy score than the first dog has, the controller 112 may select second one or more cameras viewing the back yard area rather than the first one or more cameras viewing the front door area.

In some implementations, the controller 112 determines, based on pre-learned reference signals, an emotion of the animal 10 corresponding to a sample signal obtained from a sensing device (e.g., audio sensor 104). For example, the controller 112 compares the sound 14 (e.g., a pitch, a duration, number of barks) with the reference sounds 126 to determine an emotion corresponding to the sound 14. In some examples, the controller 112 may include one or more reference sounds 126 corresponding to different emotions of the animal 10. For example, the reference sounds 126A, 126B, and 126C may correspond to greeting barks, distress barks, and aggression barks, respectively.

In some implementations, the reference signals may be associated with an accuracy score or a sensitivity level such as a hit rate, a false alarm rate, a false positive ratio, etc. For instance, the reference sound 126A is associated with a false alarm rate of 1% which indicates that 1% of sounds determined as greeting barks by the controller 112 may actually correspond to other emotions such as distress or aggression. Similarly, the reference sounds 126B and 126C may be associated with different false alarm rates (e.g., 10%, 20%, 25%). In some implementations, the controller 112 may include a learning rating that indicates a learning progress or an amount of data (e.g., example sounds of the animals) since a reference time instant. In some cases, the accuracy score may be related to the learning rating that indicates the learning progress. For example, as the learning rate increases, the accuracy score (e.g., a hit rate) may increase and the false alarm rate may decrease.

In some implementations, the controller 112 determines the accuracy score based on a reception of sensor signals (e.g., an image from camera 110) that confirm the sound received from the audio sensor 104 corresponds to an emotion of the animal 10 or an event occurred at the property 102. Additionally or alternatively, the controller 112 may receive a user input to confirm that the sound received from the audio sensor 104 corresponds to the emotion of the animal 10 or the event occurred at the property 102. For example, the controller 112 may receive a user input that determines to record a sound 14 (e.g., count as a correct hit) or to ignore the sound 14 (e.g., count as a false alarm).

In some implementations where multiple animals exist in the property 102, the controller 112 may be trained to distinguish sounds from the multiple animals and identify an emotion or statue of the corresponding animal. In some examples, the controller 112 may include a clustering algorithm that differentiates the sounds received from the multiple animals and that groups the sounds into emotions or states of the respective animals. For example, the controller 112 may differentiate the sounds from the multiple animals and identify an emotion or statue of the corresponding animal based on a frequency range of the sounds. In some implementations, the controller 112 identifies the multiple animals based on the sounds from the multiple animals, analyzes the sounds per the individual animals, and determines reference sounds per the individual animals.

In some examples, the controller 112 may receive various sound signals from the audio sensor 104 over the communication link 114. For example, the audio sensor 104 may receive a sound 14 from the animal 10 and other types of sounds from an inside/outside of the property 102 (e.g., noises from a refrigerator, a clock, a car around the property 102). In another example, the audio sensor 104 may detect a sound from window/glass breaking or a voice command from a user. For example, the controller 112 may distinguish the sound from the animal 10 from the other type of sounds based on comparison with a reference sound of the animal 10.

In some implementations, the controller 112 may receive a signal from the signal detector 108 configured to detect signals from the wearable device 12 carried by the animal 10. In some examples, the controller 112 determines a location of the animal 10 in the property 102 based on the received signal 18 and tracks the location of the animal 10 in the property 102 via various wireless tracking technologies. In some examples where the wearable device 12 emits the signal 18 at a location corresponding to a coordinate of the property 102, the controller 112 may determine a location of the animal 10 based on the coordinate of the property 102 from which the wearable device 12 emits the signal 18. In some examples, the controller 112 may utilize the signal 18 from the wearable device 12 to fine-tune a location of the animal 10 determined based on a sound 14 detected by the audio sensor 104.

In some implementations, the controller 112 may receive an image or video from an imaging sensor 106, and analyze the image or video to interpret a body language of the animal 10 such as motions, poses, or postures of the animal 10. In some examples, the image or video from the imaging sensor 106 may be utilized in combination with one or both of audio data from the audio sensor 104 and the signal from the wearable device 12 to improve interpretation of the animal's reaction to an event. For example, the controller 112 analyzes a video of the animal 10 (e.g., a dog) and determines that the animal 10 places its tail at an up position or a down position, or waggles its tail side to side. In some examples, the controller 112 may detect an amount of movement, a stance shape, a jumping motion, etc. of the animal 10.

In some implementations, the controller 112 generates, based on an image or video of the animal 10, a body model (e.g., a skeletal model) that represents a posture or pose of the animal 10, and analyzes motions of the animal 10 based on the body model. For example, a body model may include model points that respectively correspond to a body part(s) of the animal 10 such as a head, a tail, back hips, or shoulder blades. The controller 112 may determine an emotion based on the generated model. For example, the controller 112 determines that the animal 10 is in a playful state based on model points indicating that the head is down and the hips are up with a waggling tail, that the animal 10 is in a scared state based on model points indicating that the tail is down and hips lean back, and that the animal 10 is in an aggressive state based on model points indicating the shoulder blades correspond to a wide stance with the head forward.

In some implementations, in a similar manner described above with respect to learning based on audio signals, the controller 112 may include a learning algorithm that aggregates images or videos of an animal 10 obtained from the imaging sensor 106 and that determines an emotion of the animal corresponding to the images or videos. For example, the controller 112 may include an artificial neural network that can be trained with a wide variety of postures or motions of the animal 10. In some examples, each posture or motion may be assigned to a label in the neural network corresponding to an emotion of the animal 10. For example, a waggling tail may be assigned to motion type A corresponding to greeting, while a wide stance may be assigned to posture type B corresponding to aggression. In some implementations, the controller 112 may train the neural network for multiple animals or multiple breeds (e.g., breeds of dogs) based on postures and motions of each animal or breed.

In some implementations, the controller 112 determines, based on body model data described above and calibration data of the imaging sensor 106, a location of the animal 10 and an orientation toward which the animal 10 reacts (e.g., barks, moves, etc.). The calibration data of the imaging sensor 106 may include location information (e.g., 3D map information, fields of view of cameras) that assists in determining a physical location of the animal 10 based on an area of the property 102 in an image captured by the imaging sensor 106. For example, the controller 112 determines that the animal 10 is located at a front foyer based on the location information of the calibration data of the imaging sensor 106, and that the animal 10 is oriented toward a front door based on the body model data in which a head model point is located closer to the front door than a tail model point is to the front door.

In some examples, the controller 112 may determine an orientation of the animal 10 based on a projection line that extends from a body model of the animal 10. For example, based on a virtual projection line that extends from a center point between model points of shoulder blades in a direction to a front door of the property 102, the controller 112 determines that an object corresponding to the animal 10's reaction is located at the front door. In some examples, the controller 112 may determine one or more cameras that can capture an image of an area corresponding to the projection line. In some examples, the controller 112 may perform searching for an object (e.g., a person, an animal, a vehicle, etc.) outward from the area corresponding to the projection line. For example, the controller 112 may pan/tilt the imaging sensor 106, another camera (e.g., camera 110), or both, based on an actuation by a piezo electrical material (e.g., PZT) or a rotation about an axis, to search areas of the property 102 beginning from a location which the animal 10 faces toward.

In some implementations, the controller 112 may include one or more rules associated to a signal from the animal 10 or an event that likely occurs corresponding to the signal. For example, the user 120 may preset a notification rule corresponding to a bark sound from the animal 10. As shown in FIG. 1, the controller 112 may send a notification message 122 "Warning! Type B Bark detected. Potential Intruder approaching the door" to a user device 118 carried by the user 120 based on a determination that the bark sound from the animal 10 is classified as type B bark. Additionally or alternatively, the controller 112 may send the user 120 a sample image or video 124 that shows an area which the animal 10 reacts toward, the stranger 20 at the area, or the animal 10. In some examples, the controller 112 may send recorded sounds that the animal 10 made to indicate the stranger 20 at the area.

In some implementations, the one or more rules may be set according to other conditions such as a time of day, a presence/absence of a user, or a location of a user. In some examples, the user 120 may set up a method of notification based on such conditions. For example, the user 120 may set up the monitoring system 100 to send a notification via a text message when the user 120 is at the property or within a distance from the property during the day. In other examples, the monitoring system 100 may be configured to report an event to a central security system in certain times (e.g., at night) or when the user 120 is outside of the distance from the property 102.

In some implementations, the monitoring system 100 may include a deterrent device 128 configured to warn a potential intruder 20 at the property 102 based on a signal from the animal 10. For example, the deterrent device 128 may include a speaker (e.g., an outdoor speaker, a doorbell, an intercom) installed at the property 102 and configured to output or broadcast a sound (e.g., a bark sound) from the animal 10. In some examples, the deterrent device 128 may amplify and repeat the sound from the animal 10 to further forewarn the potential intruder 20 of being detected and monitored. In other examples, the deterrent device 128 may be a flashing light that indicates a detection of the potential intruder 20. In some cases, the deterrent device 128 may include a lighting device configured to warn the potential intruder 20 in conjunction with other deterrent methods describe above.

In some examples, the monitoring system 100 may include one or more lighting devices that are configured to be turned on or off based on a signal from the animal 10. For example, the controller 112 turns on the one or more lighting devices based on a detection of a bark sound from the animal 10 to provide visibility to the animal 10, the camera 110, or the user 120. In some examples, the one or more lighting devices may be turned back off based on lack of detection of a signal from the animal 10 for a threshold time.

In some cases, controlling the one or more lighting devices based on the signal from the animal 10 may reduce consumption of energy, for example, by supplementing or correcting detection results from other sensing devices. For instance, a motion detector (e.g., passive infrared sensors) may detect a minor object such as a moving tree or flying leaf in its detection range, which triggers a lighting device to turn on due to the detection of the minor object. Absent detection of a signal from the animal 10, the system 100 may determine that the decoction from the motion detector corresponds to a false detection. In this case, the system 100 may maintain the lighting device in an off-state. In other cases, the user 120 may set up other conditions for controlling the lighting device. For example, the lighting device may be turned on based only on a signal from the animal 10, based on both of the signal from the animal 10 and a detection from the motion detector, or based on other conditions such as a preset schedule for lighting (e.g., 8 PM-5 AM).

In some implementations, the monitoring system 100 may be applicable to other emergency situations. For instance, the monitoring system 100 may locate an animal 10 that makes a signal (e.g., a sound, a motion, etc.) corresponding to distress in case of fire occurring at the property 102. In some cases, the monitoring system 100 may be also trained/ assisted based on human signals such as voices and motions in a similar way as the monitoring system 100 is trained/ assisted based on animal signals. For example, the monitoring system 100 may classify a high pitch voice outside of a reference pitch range of the user 120 as an alarm signal, and report an event to a central alarm system with an image/ video of an area of the property 102 where the user 120 is located.

Figure 2:
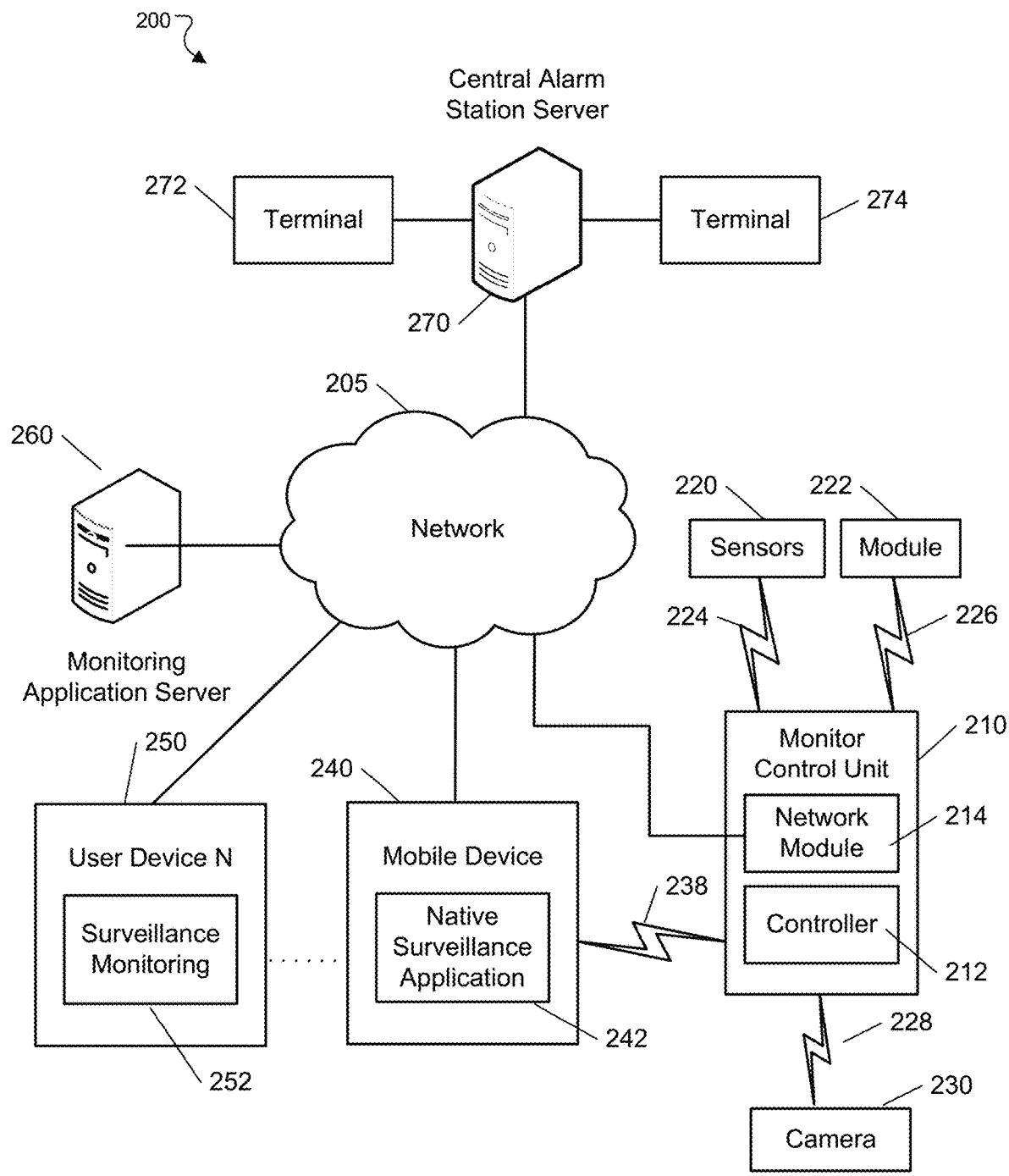
FIG. 2 illustrates another example of a monitoring system.

FIG. 2 illustrates an example of a system 200 configured to provide surveillance, canine assisted home monitoring, and reporting of information related to an event or an emotion of an animal corresponding to a signal from the animal. The system 200 includes a network 205, a monitoring system control unit 210, one or more user devices 240, 250, a monitoring application server 260, and a central alarm station server 270. In some examples, the network 205 facilitates communications between the monitoring system control unit 210, the one or more user devices 240, 250, the monitoring application server 260, and the central alarm station server 270.

The network 205 is configured to enable exchange of electronic communications between devices connected to the network 205. For example, the network 205 may be configured to enable exchange of electronic communications between the monitoring system control unit 210, the one or more user devices 240, 250, the monitoring application server 260, and the central alarm station server 270. The network 205 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. The network 205 may include multiple networks or subnetworks, each of which may include, for example, a wired or wireless data pathway. The network 205 may include a circuit-switched network, a packet-switched data network, or any other network able to carry electronic communications (e.g., data or voice communications). For example, the network 205 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 205 may include one or more networks that include wireless data channels and wireless voice channels. The network 205 may be a wireless network, a broadband network, or a combination of networks including a wireless network and a broadband network.

The monitoring system control unit 210 includes a controller 212 and a network module 214. The controller 212 is configured to control a monitoring system (e.g., a home alarm or security system) that includes the monitoring system control unit 210. In some examples, the controller 212 may include a processor or other control circuitry configured to execute instructions of a program that controls operation of an alarm system. In these examples, the controller 212 may be configured to receive input from sensors, detectors, or other devices included in the alarm system and control operations of devices included in the alarm system or other household devices (e.g., a thermostat, an appliance, lights, etc.). For example, the controller 212 may be configured to control operation of the network module 214 included in the monitoring system control unit 210.

The network module 214 is a communication device configured to exchange communications over the network 205. The network module 214 may be a wireless communication module configured to exchange wireless communications over the network 205. For example, the network module 214 may be a wireless communication device configured to exchange communications over a wireless data channel and a wireless voice channel. In this example, the network module 214 may transmit alarm data over a wireless data channel and establish a two-way voice communication session over a wireless voice channel. The wireless communication device may include one or more of a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 214 also may be a wired communication module configured to exchange communications over the network 205 using a wired connection. For instance, the network module 214 may be a modem, a network interface card, or another type of network interface device. The network module 214 may be an Ethernet network card configured to enable the monitoring system control unit 210 to communicate over a local area network and/or the Internet. The network module 214 also may be a voiceband modem configured to enable the alarm panel to communicate over the telephone lines of Plain Old Telephone Systems (POTS).

The monitoring system that includes the monitoring system control unit 210 includes one or more sensors or detectors. For example, the monitoring system may include multiple sensors 220. The sensors 220 may include an audio sensor, an imaging sensor, a contact sensor, a motion sensor, a glass break sensor, or any other type of sensor included in an alarm system or security system. The sensors 220 also may include an environmental sensor, such as a temperature sensor, a water sensor, a rain sensor, a wind sensor, a light sensor, a smoke detector, a carbon monoxide detector, an air quality sensor, etc. The sensors 220 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 220 may include a radio-frequency identification (RFID) sensor that identifies a particular article that includes a pre-assigned RFID tag. In some implementations, the sensors 220 may be configured to detect a signal from a wearable device 12 (see FIG. 1) carried by an animal or a human user.

The monitoring system control unit 210 communicates with the module 222 and the camera 230 to perform surveillance or monitoring. The module 222 is connected to one or more lighting systems and is configured to control operation of the one or more lighting systems. The module 222 may control the one or more lighting systems based on commands received from the monitoring system control unit 210. For instance, the module 222 may cause a lighting system to illuminate an area to provide a better image of the area when captured by a camera 230. In some examples, the module 222 may include a deterrent device such as an outdoor speaker configured to transmit a sound from an inside of a property to an outside of the property.

The camera 230 may be a video/photographic camera or other type of optical sensing device configured to capture images. For instance, the camera 230 may be configured to capture images of an area within a building monitored by the monitoring system control unit 210. The camera 230 may be configured to capture single, static images of the area and also video images of the area in which multiple images of the area are captured at a relatively high frequency (e.g., thirty images per second). The camera 230 may be controlled based on commands received from the monitoring system control unit 210. The camera 230 may correspond to the imaging sensor 106 or the camera 110 in FIG. 1.

The camera 230 may be triggered by several different types of techniques. For instance, a Passive Infra Red (PIR) motion sensor may be built into the camera 230 and used to trigger the camera 230 to capture one or more images when motion is detected. The camera 230 may also include a microwave motion sensor built into the camera and used to trigger the camera 230 to capture one or more images when motion is detected. The camera 230 may have a "normally open" or "normally closed" digital input that can trigger capture of one or more images when external sensors (e.g., the sensors 220, PIR, door/window, etc.) detect motion or other events. In some implementations, the camera 230 receives a command to capture an image when external devices detect motion or another potential alarm event. The camera 230 may receive the command from the controller 212 or directly from one of the sensors 220.

In some examples, the camera 230 triggers integrated or external illuminators (e.g., Infra Red, Z-wave controlled "white" lights, lights controlled by the module 222, etc.) to improve image quality when the scene is dark. An integrated or separate light sensor may be used to determine if illumination is desired and may result in increased image quality.

The camera 230 may be programmed with any combination of time/day schedules, system "arming state", or other variables to determine whether images should be captured or not when triggers occur. The camera 230 may enter a low-power mode when not capturing images. In this case, the camera 230 may wake periodically to check for inbound messages from the controller 212. The camera 230 may be powered by internal, replaceable batteries if located remotely from the monitoring system control unit 210. The camera 230 may employ a small solar cell to recharge the battery when light is available. Alternatively, the camera 230 may be powered by the controller's 212 power supply if the camera 230 is co-located with the controller 212.

The sensors 220, the module 222, and the camera 230 communicate with the controller 212 over communication links 224, 226, and 228. The communication links 224, 226, and 228 may be a wired or wireless data pathway configured to transmit signals from the sensors 220, the module 222, and the camera 230 to the controller 212. The sensors 220, the module 222, and the camera 230 may continuously transmit sensed values to the controller 212, periodically transmit sensed values to the controller 212, or transmit sensed values to the controller 212 in response to a change in a sensed value.

The communication link 228 over which the camera 230 and the controller 212 communicate may include a local network. The camera 230 and the controller 212 may exchange images and commands over the local network. The local network may include 802.11 "WiFi" wireless Ethernet (e.g., using low-power WiFi chipsets), Z-Wave, Zigbee, Bluetooth, "Homeplug" or other "Powerline" networks that operate over AC wiring, and a Category 5 (CAT5) or Category 6 (CAT6) wired Ethernet network.

The monitoring application server 260 is an electronic device configured to provide monitoring services by exchanging electronic communications with the monitoring system control unit 210, the one or more user devices 240, 250, and the central alarm station server 270 over the network 205. For example, the monitoring application server 260 may be configured to monitor events (e.g., alarm events) generated by the monitoring system control unit 210. In this example, the monitoring application server 260 may exchange electronic communications with the network module 214 included in the monitoring system control unit 210 to receive information regarding events (e.g., alarm events) detected by the monitoring system control unit 210. The monitoring application server 260 also may receive information regarding events (e.g., alarm events) from the one or more user devices 240, 250.

In some examples, the monitoring application server 260 may route alarm data received from the network module 214 or the one or more user devices 240, 250 to the central alarm station server 270. For example, the monitoring application server 260 may transmit the alarm data to the central alarm station server 270 over the network 205.

The monitoring application server 260 may store sensor and image data received from the monitoring system and perform analysis of sensor and image data received from the monitoring system. Based on the analysis, the monitoring application server 260 may communicate with and control aspects of the monitoring system control unit 210 or the one or more user devices 240, 250.

The central alarm station server 270 is an electronic device configured to provide alarm monitoring service by exchanging communications with the monitoring system control unit 210, the one or more user devices 240, 250, and the monitoring application server 260 over the network 205. For example, the central alarm station server 270 may be configured to monitor alarm events generated by the monitoring system control unit 210. In this example, the central alarm station server 270 may exchange communications with the network module 214 included in the monitoring system control unit 210 to receive information regarding alarm events detected by the monitoring system control unit 210. The central alarm station server 270 also may receive information regarding alarm events from the one or more user devices 240, 250.

The central alarm station server 270 is connected to multiple terminals 272 and 274. The terminals 272 and 274 may be used by operators to process alarm events. For example, the central alarm station server 270 may route alarm data to the terminals 272 and 274 to enable an operator to process the alarm data. The terminals 272 and 274 may include general-purpose computers (e.g., desktop personal computers, workstations, or laptop computers) that are configured to receive alarm data from a server in the central alarm station server 270 and render a display of information based on the alarm data. For instance, the controller 212 may control the network module 214 to transmit, to the central alarm station server 270, alarm data indicating that a sensor 220 detected a door opening when the monitoring system was armed. The central alarm station server 270 may receive the alarm data and route the alarm data to the terminal 272 for processing by an operator associated with the terminal 272. The terminal 272 may render a display to the operator that includes information associated with the alarm event (e.g., the name of the user of the alarm system, the address of the building the alarm system is monitoring, the type of alarm event, etc.) and the operator may handle the alarm event based on the displayed information.

In some implementations, the terminals 272 and 274 may be mobile devices or devices designed for a specific function. Although FIG. 2 illustrates two terminals for brevity, actual implementations may include more (and, perhaps, many more) terminals.

The one or more user devices 240, 250 are devices that host and display user interfaces. For instance, the user device 240 is a mobile device that hosts one or more native applications (e.g., the native surveillance application 242). The user device 240 may be a cellular phone or a non-cellular locally networked device with a display. The user device 240 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 240 may perform functions unrelated to the monitoring system, such as placing personal telephone calls, playing music, playing video, displaying pictures, browsing the Internet, maintaining an electronic calendar, etc.

The user device 240 includes a native surveillance application 242. The native surveillance application 242 refers to a software/firmware program running on the corresponding mobile device that enables the user interface and features described throughout. The user device 240 may load or install the native surveillance application 242 based on data received over a network or data received from local media. The native surveillance application 242 runs on mobile devices platforms, such as iPhone, iPod touch, Blackberry, Google Android, Windows Mobile, etc. The native surveillance application 242 enables the user device 240 to receive and process image and sensor data from the monitoring system.

The user device 250 may be a general-purpose computer (e.g., a desktop personal computer, a workstation, or a laptop computer) that is configured to communicate with the monitoring application server 260 and/or the monitoring system control unit 210 over the network 205. The user device 250 may be configured to display a surveillance monitoring user interface 252 that is generated by the user device 250 or generated by the monitoring application server 260. For example, the user device 250 may be configured to display a user interface (e.g., a web page) provided by the monitoring application server 260 that enables a user to perceive images captured by the camera 230 and/or reports related to the monitoring system. Although FIG. 2 illustrates two user devices for brevity, actual implementations may include more (and, perhaps, many more) or fewer user devices.

In some implementations, the one or more user devices 240, 250 communicate with and receive monitoring system data from the monitoring system control unit 210 using the communication link 238. For instance, the one or more user devices 240, 250 may communicate with the monitoring system control unit 210 using various local wireless protocols such as wifi, Bluetooth, zwave, zigbee, HomePlug (ethernet over powerline), or wired protocols such as Ethernet and USB, to connect the one or more user devices 240, 250 to local security and automation equipment. The one or more user devices 240, 250 may connect locally to the monitoring system and its sensors and other devices. The local connection may improve the speed of status and control communications because communicating through the network 205 with a remote server (e.g., the monitoring application server 260) may be significantly slower.

Although the one or more user devices 240, 250 are shown as communicating with the monitoring system control unit 210, the one or more user devices 240, 250 may communicate directly with the sensors and other devices controlled by the monitoring system control unit 210. In some implementations, the one or more user devices 240, 250 replace the monitoring system control unit 210 and perform the functions of the monitoring system control unit 210 for local monitoring and long range/offsite communication.

In other implementations, the one or more user devices 240, 250 receive monitoring system data captured by the monitoring system control unit 210 through the network 205. The one or more user devices 240, 250 may receive the data from the monitoring system control unit 210 through the network 205 or the monitoring application server 260 may relay data received from the monitoring system control unit 210 to the one or more user devices 240, 250 through the network 205. In this regard, the monitoring application server 260 may facilitate communication between the one or more user devices 240, 250 and the monitoring system.

In some implementations, the one or more user devices 240, 250 may be configured to switch whether the one or more user devices 240, 250 communicate with the monitoring system control unit 210 directly (e.g., through link 238) or through the monitoring application server 260 (e.g., through network 205) based on a location of the one or more user devices 240, 250. For instance, when the one or more user devices 240, 250 are located close to the monitoring system control unit 210 and in range to communicate directly with the monitoring system control unit 210, the one or more user devices 240, 250 use direct communication. When the one or more user devices 240, 250 are located far from the monitoring system control unit 210 and not in range to communicate directly with the monitoring system control unit 210, the one or more user devices 240, 250 use communication through the monitoring application server 260.

Although the one or more user devices 240, 250 are shown as being connected to the network 205, in some implementations, the one or more user devices 240, 250 are not connected to the network 205. In these implementations, the one or more user devices 240, 250 communicate directly with one or more of the monitoring system components and no network (e.g., Internet) connection or reliance on remote servers is needed.

In some implementations, the one or more user devices 240, 250 are used in conjunction with only local sensors and/or local devices in a house. In these implementations, the system 200 only includes the one or more user devices 240, 250, the sensors 220, the module 222, and the camera 230. The one or more user devices 240, 250 receive data directly from the sensors 220, the module 222, and the camera 230 and sends data directly to the sensors 220, the module 222, and the camera 230. The one or more user devices 240, 250 provide the appropriate interfaces/processing to provide visual surveillance and reporting.

In other implementations, the system 200 further includes network 205 and the sensors 220, the module 222, and the camera 230 are configured to communicate sensor and image data to the one or more user devices 240, 250 over network 205 (e.g., the Internet, cellular network, etc.). In yet another implementation, the sensors 220, the module 222, and the camera 230 (or a component, such as a bridge/router) are intelligent enough to change the communication pathway from a direct local pathway when the one or more user devices 240, 250 are in close physical proximity to the sensors 220, the module 222, and the camera 230 to a pathway over network 205 when the one or more user devices 240, 250 are farther from the sensors 220, the module 222, and the camera 230. In some examples, the system leverages GPS information from the one or more user devices 240, 250 to determine whether the one or more user devices 240, 250 are close enough to the sensors 220, the module 222, and the camera 230 to use the direct local pathway or whether the one or more user devices 240, 250 are far enough from the sensors 220, the module 222, and the camera 230 that the pathway over network 205 is required. In other examples, the system leverages status communications (e.g., pinging) between the one or more user devices 240, 250 and the sensors 220, the module 222, and the camera 230 to determine whether communication using the direct local pathway is possible. If communication using the direct local pathway is possible, the one or more user devices 240, 250 communicate with the sensors 220, the module 222, and the camera 230 using the direct local pathway. If communication using the direct local pathway is not possible, the one or more user devices 240, 250 communicate with the sensors 220, the module 222, and the camera 230 using the pathway over network 205.

In some implementations, the system 200 provides end users with access to images captured by the camera 230 to aid in decision making. The system 200 may transmit the images captured by the camera 230 over a wireless WAN network to the user devices 240, 250. Because transmission over a wireless WAN network may be relatively expensive, the system 200 uses several techniques to reduce costs while providing access to significant levels of useful visual information.

In some implementations, a state of the monitoring system and other events sensed by the monitoring system may be used to enable/disable video/image recording devices (e.g., the camera 230). In these implementations, the camera 230 may be set to capture images on a periodic basis when the alarm system is armed in an "Away" state, but set not to capture images when the alarm system is armed in a "Stay" state or disarmed. In addition, the camera 230 may be triggered to begin capturing images when the alarm system detects an event, such as an alarm event, a door opening event for a door that leads to an area within a field of view of the camera 230, or motion in the area within the field of view of the camera 230. In other implementations, the camera 230 may capture images continuously, but the captured images may be stored or transmitted over a network when needed.

In some implementations, all of the processing described throughout this disclosure may be implemented in a monitoring system control panel located inside the property being monitored, as opposed to sending data to an external server for processing. For example, rather than being a separate server located in a remote location, the monitoring application server 260 may be a logical component inside of the monitoring system control unit 210. In this example, the monitoring system control unit 210 performs the processing of supervising property access without having to send image/video data to a separate server separated by a network.

In other implementations, all of the processing described throughout this disclosure may be performed on a remote server (e.g., monitoring application server 260). In these implementations, the monitoring system control panel (or sensors themselves) may send image/video data to the remote server over a network and the remote server may perform all of supervising property access. For instance, the monitoring system control unit 210 sends all captured image/video data to the monitoring application server 260 and the monitoring application server 260 performs the processing of supervising property access.

In still further implementations, the processing described throughout this disclosure may be mixed between a monitoring system control panel and a remote server. In these implementations, the monitoring system control panel and the remote server may share operations needed to analyze the sensor data. For instance, the monitoring system control panel may perform the interpretation of image/video data collected relatively recently (e.g., image/video data collected within the past three months) and the remote server may perform the detection of patterns in image/video data collected over a longer period of time (e.g., image/video data collected over the past several years). Alternatively, the monitoring system control panel may perform pre-processing of the image/video data, including collection and aggregation of the image/video data, and the remote server may perform the detailed analysis of detecting patterns within the image/video data. In the example shown in FIG. 2, the processing described throughout this disclosure may be mixed between the monitoring system control unit 210 and the monitoring application server 260.

Figure 3:
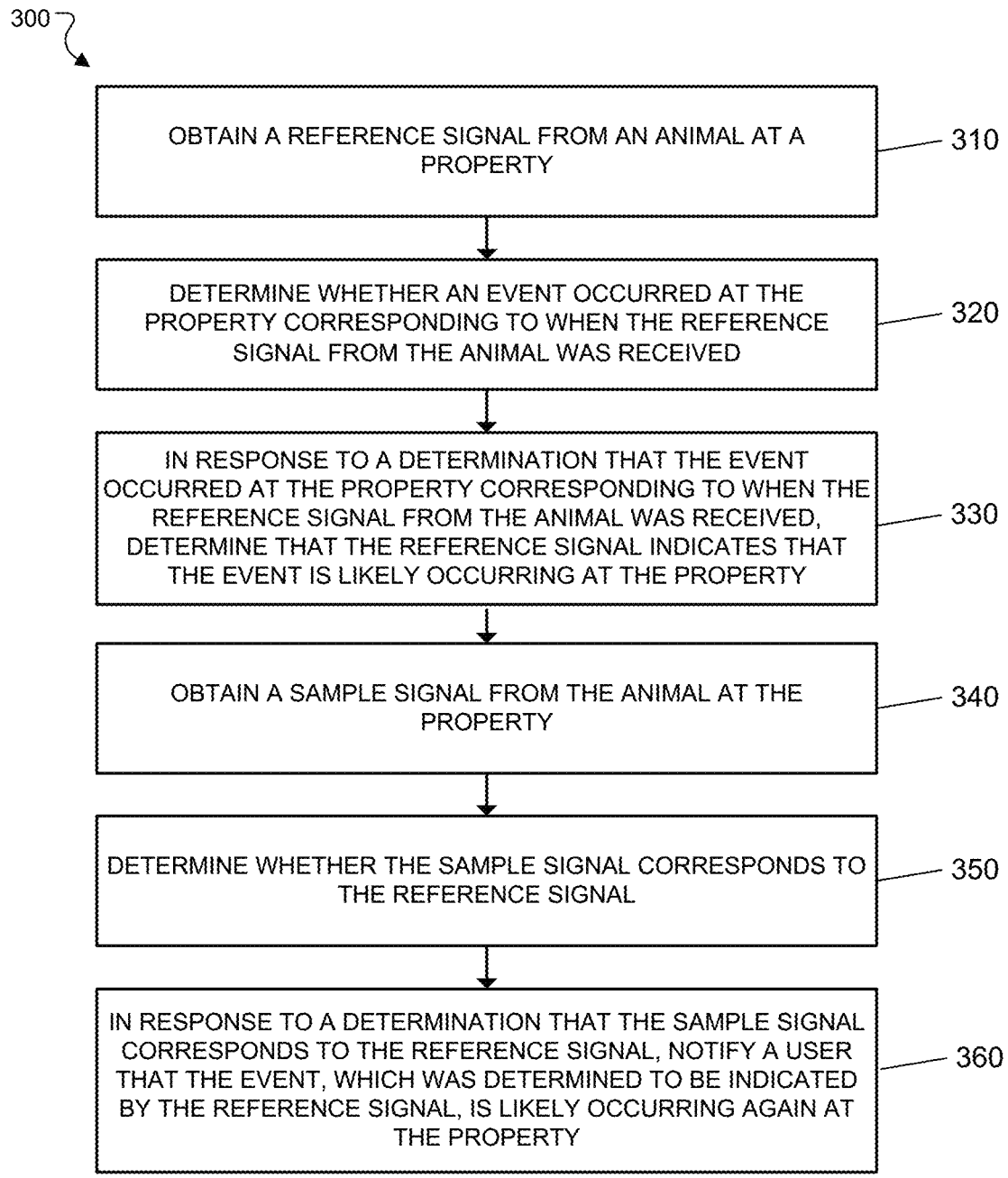
FIG. 3 illustrates an example process of a canine assisted monitoring.

FIG. 3 illustrates an example of a process 300 for determining an occurrence of an event corresponding to a signal from an animal and providing a notification regarding the event. Briefly, the process 300 may include obtaining a reference signal from an animal at a property (310), determining whether an event occurred at the property corresponding to when the reference signal from the animal was received (320), in response to a determination that the event occurred at the property corresponding to when the reference signal from the animal was received, determining that the reference signal indicates that the event is likely occurring at the property (330), obtaining a sample signal from the animal at the property (340), determining whether the sample signal corresponds to the reference signal (350), and in response to a determination that the sample signal corresponds to the reference signal, notifying a user that the event, which was determined to be indicated by the reference signal, is likely occurring again at the property (360).

The event may be occurred at various areas of the property 102 such as areas in front of the door, on the driveway, inside the house, etc. The event may include an unknown user approaching or coming inside the property 102 and a known user approaching or coming inside the property 102.

In more detail, the process 300 may include obtaining a reference signal from an animal at a property (310). For instance, referring to FIG. 1, the controller 112 may obtain a reference audio signal from the audio sensor 104, a reference image signal from the imaging sensor 106, or a reference signal from the signal detector 108 configured to detect signals emitted from the wearable device 12 carried by the animal 10. In some examples, the reference signal from a sensing device includes a plurality of reference signals corresponding to different signals from the animal 10. In some cases, each reference signal (e.g., 126A, 126B, 126C) is determined based on an average or range of multiple signals such as a mean pitch of audio signals or a pitch range of audio signals.

The process 300 may include determining whether an event occurred at the property corresponding to when the reference signal from the animal was received (320). For example, the system 100 may detect, when the reference signal was received, a known user (e.g., an owner of the animal, a family member, a dog walker, a delivery person) approaching the property 102, an armed state of the property 102, or a door status (e.g., a garage door being open). For instance, the system 100 determines, when the animal barks at the door, whether the owner came home based on an image from the camera 110 or other sensor signals. In other examples, the system 100 determines, when the animal barks at the door, whether the door is opened or the system is disarmed based on an image from the camera 110 or other sensor signals. In another example, the system 100 may determine whether a stranger 20 approaches the property 102 when the animal 10 makes the reference signal 126B based on an image from the camera 110 or other sensors (e.g., motions sensors) installed at the property 102.

In some implementations, the system 100 utilizes facial recognition techniques in the process 300 (e.g., 320). For example, based on the facial recognition techniques, the system 100 may learn how the animal 10 reacts to a person(s) that is enrolled in the system 100, and how the animal reacts to a person(s) who is not enrolled. In some examples, the system 100 recognizes known users based on pre-registered images of the known users, and associates a reference signal from the animal 10 to one or more known users. For example, the system 100 may assign the reference signal 126A to family members, the reference signal 126B to a known visitor, and the reference signal 126C to unknown visitors. In some cases, the reference signal 126A may include sub-signals each corresponding to respective family members.

In some implementations, the system 100 may store an image from the camera 110 corresponding to a reference signal from the animal 10. For example, the system 100 stores an image of the stranger 20 captured by the camera 110 when the animal 10 makes the reference signal 126B (e.g., a growl sound), and associates the image of the stranger 20 to an event where the stranger 20 approaches the property 102. In some examples, the system 100 may detect, with or without detection of a signal from the animal 10, the stranger 20 approaching the property 102 based on the stored image of the stranger 20. In some cases, the system 100 may alert the user 120 of the detection of the stranger 20 based on the stored image of the stranger 20.

The process 300 may include, in response to a determination that the event occurred at the property corresponding to when the reference signal from the animal was received, determining that the reference signal indicates that the event is likely occurring at the property (330). In some implementations, utilizing information related to the event occurred at the property 102 corresponding to when the reference signal was received, the system 100 may train a neural network classifier. For example, as the controller 112 frequently detects a disarm code being input followed by a bark sound (e.g. type A bark) or a garage door being opened followed by a bark sound, the controller 112 determines that type A bark indicates that a known user returns home. In other examples, as the controller 112 detects a bark sound followed by an input of a disarm code, the controller 112 determines that type A bark indicates that a known user returns home. In these examples, the controller 112 detects a bark sound when the owner comes home, and then recognizes an event in which the owner input a disarm code on a control panel inside of the property 102. Similarly, as the controller 112 frequently detects a stranger 20 when the animal makes type B bark that is different from type A bark, the controller 112 determines that type B bark indicates that a stranger 20 approaches the property 102 or the animal 10 is distressed.

In some implementations, alternatively or in addition, the reference signal may be associated with an emotion of the animal 10. For example, the system 100 may obtain information, from the user 120 or other sources such as the Internet, about bark pitch ranges or postures of the animal 10 related to emotions of the animal 10. In this example, the controller 112 may determine which emotion corresponds to the obtained reference signal based on the information. In other examples, the controller 112 may determine an emotion of the animal 10 corresponding to the reference signal based on learning from an event occurred at the property 102 corresponding to when the reference signal was received. For instance, type B bark, which is a reference signal that the animal 10 makes at the stranger 20, may corresponds to distress or aggression of the animal 10.

In some implementations, the process 300 may include determining an accuracy score or sensitivity level for the reference signal based on a determination that the event occurred at the property corresponding to when the reference signal from the animal was received. For example, the system 100 may increase the false alarm rate for type B bark when the animal 10 makes bark type B even when the user 120 returns home or when no stranger is detected at the property 102. In some cases where a false alarm rate of a reference signal is greater than a threshold level, the system 100 may determine to associate the reference signal to a different event or to reset a learning algorithm of the system 100.

The process 300 may include obtaining a sample signal from the animal at the property (340). For instance, the controller 112 may obtain a sample audio signal from the audio sensor 104, a sample image signal from the imaging sensor 106, or a sample reference signal from the signal detector 108. In some examples, the controller 112 may obtain a sample sound signal from the audio sensor 104 based on a detection threshold. For example, the controller 112 includes a signal filter (e.g., a low pass filter, a band pass filter, a high pass filter) that can distinguish the sound from the animal 10 from other sound signals received at the audio sensor 104.

The process 300 may include determining whether the sample signal corresponds to the reference signal (350). For instance, the controller 112 may determine whether the sample signal corresponds to the reference signal based on comparison results between the sample signal and the reference signal. For example, the controller 112 may compute a correlation value (e.g., a cross correlation) between the sample signal and the reference signal, and determines that the sample signal corresponds to the reference signal based on the correlation value being greater than a threshold value. In other examples, as described above, the controller 112 may compare pitches, durations, or other characteristics of the sample signal and the reference signal to determine whether the sample signal corresponds to the reference signal.

The process 300 may include, in response to a determination that the sample signal corresponds to the reference signal, notifying a user that the event, which was determined to be indicated by the reference signal, is likely occurring again at the property (360). For instance, the controller 112 may include a preset rule for notification corresponding to the event. In some implementations, the preset rules may be related to likelihood of occurrence of the event or an accuracy score or a sensitivity level of the animal 10. In some examples, the controller 112 may include information related to an accuracy score for each type of sound signal of the animal 10, and the user 120 may set up a threshold level for a notification. For example, the user 120 may set up a threshold false alarm rate at 20% for a text notification. In this example, a detection of type C bark would be ignored because type C bark corresponds to a false alarm rate of 25%. In some examples where the user 120 receives information about an area or an object which the animal 10 reacts toward, the user 120 may provide an input to the controller 112 to increase or decrease the false alarm rate based on a determination of a true alarm or a false alarm from the received information.

Figure 4:
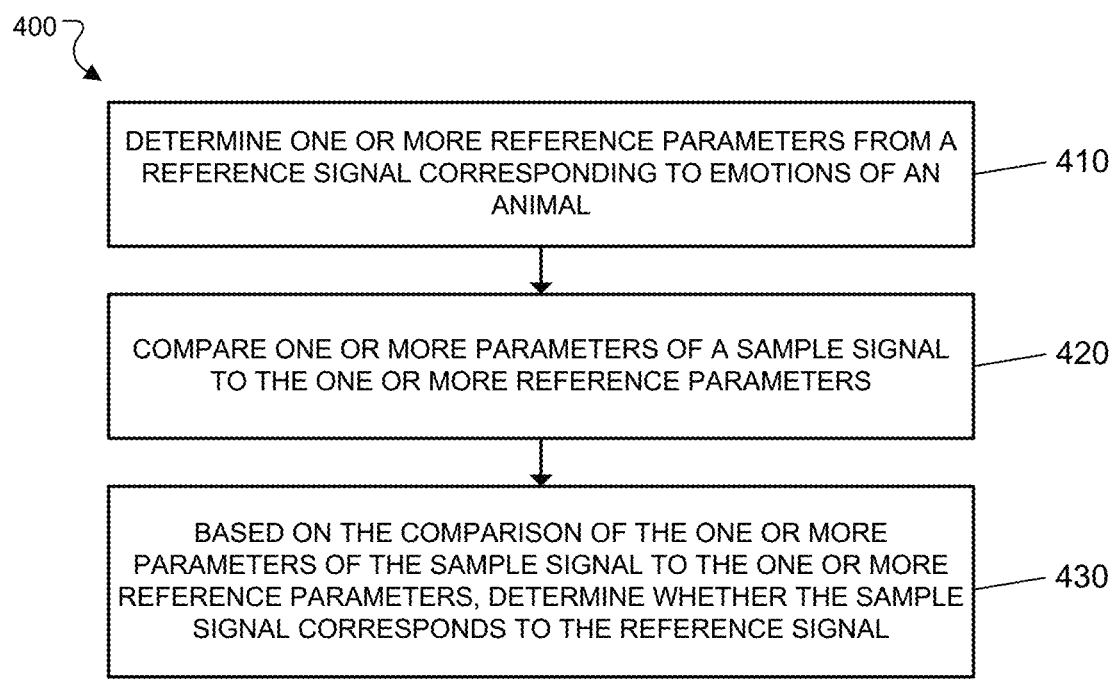
FIG. 4 illustrates an example processes of determining whether a sample signal from an animal corresponds to a reference signal.

FIG. 4 illustrates an example process 400 of determining whether a sample signal from an animal corresponds to a reference signal. Briefly, the process 400 may include determining one or more reference parameters from a reference signal corresponding to emotions of an animal (410), comparing one or more parameters of the sample signal to the one or more reference parameters, respectively (420), and based on the comparison of the one or more parameters of the sample signal to the one or more reference parameters, respectively, determining whether the sample signal corresponds to the reference signal (430).

In more detail, the process 400 may include determining one or more reference parameters from a reference signal corresponding to emotions of an animal (410). For example, referring to FIG. 1, the controller 112 may include a neural network trained to classify one or more of the pitch, duration, or number of peaks of the reference signal to emotions of the animal 10. The controller 112 may store information regarding ranges of the pitch, duration, or number of peaks of the reference signal corresponding to each of the emotions of the animal 10.

The process 400 may include comparing one or more parameters of the sample signal to the one or more reference parameters, respectively (420). For instance, the controller 112 may determine one or more of a pitch, duration, or number of peaks of a sample signal corresponding to a first sound signal. The controller 112 then may determine whether one or more of the pitch, duration, or number of peaks of the first sound represented by the sample signal match one or more of a pitch, duration, or number of peaks of a second sound represented by the reference signal.

In some examples, as described above, the controller 112 may include information regarding ranges of the pitch, duration, or number of peaks of the reference signal corresponding to each emotion of the animal 10. The controller 112 may compare at least one of (i) the pitch of the sample signal with the range of the pitch of the reference signal, (ii) the duration of the sample signal with the range of the duration of the reference signal, or (iii) the number of peaks of the sample signal with the range of the number of peaks of the reference signal.

The process 400 may include, based on the comparison of the one or more parameters of the sample signal to the one or more reference parameters, respectively, determining whether the sample signal corresponds to the reference signal (430). For example, the controller 112 may determine that the sample signal corresponds to the reference signal if a number of parameters of the sample signal matching the reference signal is greater than a threshold number. In particular, when the reference signal includes sound signals as described above, the controller 112 may determine that the sample signal corresponds to the reference signal if two or more parameters (e.g., pitch and duration, pitch and number of peaks, or duration and number of peaks) of the sample signal match those of the reference signal to determine an emotion of the animal 10 corresponding to the sample signal.

Alternatively or in addition, the reference signal and the sample signal may include video signals showing movement of the animal 10. In this case, determining whether the sample signal corresponds to the reference signal may include determining whether the movement of the animal 10 shown in the reference signal matches movement of the animal 10 shown in the sample signal. For instance, the controller 112 may be trained to classify one or more of postures, orientations, speeds, or accelerations of the animal 10 corresponding to emotions of the animal 10. The controller 112 may determine that the sample signal corresponds to the reference signal if two or more parameters (e.g., posture and speed, orientation and acceleration, etc.) of the sample signal match those of the reference signal to determine an emotion of the animal corresponding to the sample signal.

In some cases, where the controller 112 includes a neural network, the controller 112 may be configured to, without necessarily comparing the one or more parameters of the sample signal to the one or more reference parameters, determine whether the sample signal corresponds to the reference signal. In these cases, the neural network of the controller 112 may trained with multiple reference signals, and output a reference signal among the multiple reference signals by processing the sample signal through the trained neural network. Alternatively or in addition, the trained neural network of the controller 112 may output an emotional state of the animal corresponding to the sample signal by processing the sample signal.

Figure 5:
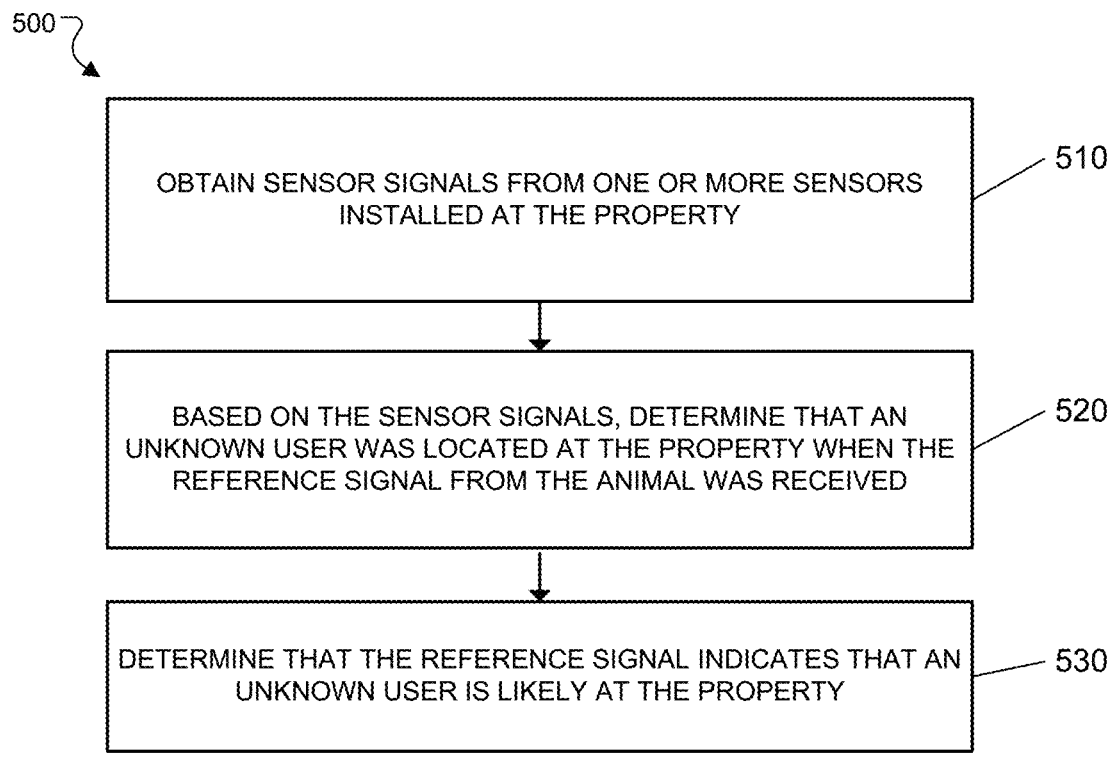
FIG. 5 illustrates an example processes of determining that a reference signal indicates an unknown user is likely at a property.

FIG. 5 illustrates an example process 500 of determining that a reference signal indicates an unknown user is likely at a property. Briefly, the process 500 may include obtaining sensor signals from one or more sensors installed at the property (510), based on the sensor signals, determining that an unknown user was located at the property when the reference signal from the animal was received (520), and based on determining that the unknown user was located at the property when the reference signal from the animal was received, determining that the reference signal indicates that an unknown user is likely at the property (530).

In more detail, the process 500 may include obtaining sensor signals from one or more sensors installed at the property (510). For example, referring to FIG. 1, the controller 112 may obtain a sound signal from the audio sensor 104, an image or video signal from the imaging sensor 106, a location signal or identification signal from the signal detector 108. In some cases, the controller 112 may obtain a sensor signal from a wearable device 12 carried by the animal. The sensor signal from the wearable device 12 may include at least one of an audio signal of the animal, location information of the animal, movement information of the animal, or an image or video of areas of the property captured by the sensor carried by the animal.

For instance, the controller 112 may obtain a sensor signal from the wearable device 12 that emits the signal 18 corresponding to a location of the animal 10 in the property 102. In some examples, the controller 112 may utilize the sensor signal 18 from the wearable device 12 to fine-tune a location of the animal 10 that is determined based on the sound signal detected by the audio sensor 104 or the video signal from the imaging sensor 106. In some examples, the controller 112 may obtain other sensor signals such as (i) a sensor signal indicating opened or closed states of a door of the property 102 or a garage of the property 102 and (ii) a sensor signal indicating armed or disarmed states of the property 102.

The process 500 may include, based on the sensor signals, determining that an unknown user was located at the property when the reference signal from the animal was received (520). For example, the controller 112 may identify an unknown user 20 located at an area of the property 102 based on the video signal from the imaging sensor 106, and determine that the unknown user was located at the property 102 when the animal 10 made a bark sound detected by the audio sensor 104.

In some examples, the controller 112 may first determine a location of the animal 10 based on sensor signals from one or more of the imaging sensor 106, the audio sensor 104, and the signal detector 108. The controller 112 may subsequently capture a video from the imaging sensor 106 of an area around the determined location of the animal 10. If an unknown user 20 is found in the video of the area around the determined location of the animal 10, the controller 112 may determine that the unknown user was located at the property when the reference signal from the animal 10 was received.

The process 500 may include, based on determining that the unknown user was located at the property when the reference signal from the animal was received, determining that the reference signal indicates that an unknown user is likely at the property (530). For example, the controller 112 may generate metadata including the reference signal and a corresponding event indicating an unknown user is likely at the property based on determining that the unknown user was located at the property when the reference signal from the animal was received. In some cases, the controller 112 may be configured to, based on multiple instances of the animal 10 reacting to the unknown user with the reference signal, determine that the reference signal indicates that an unknown user is likely at the property 102.

Figure 6:
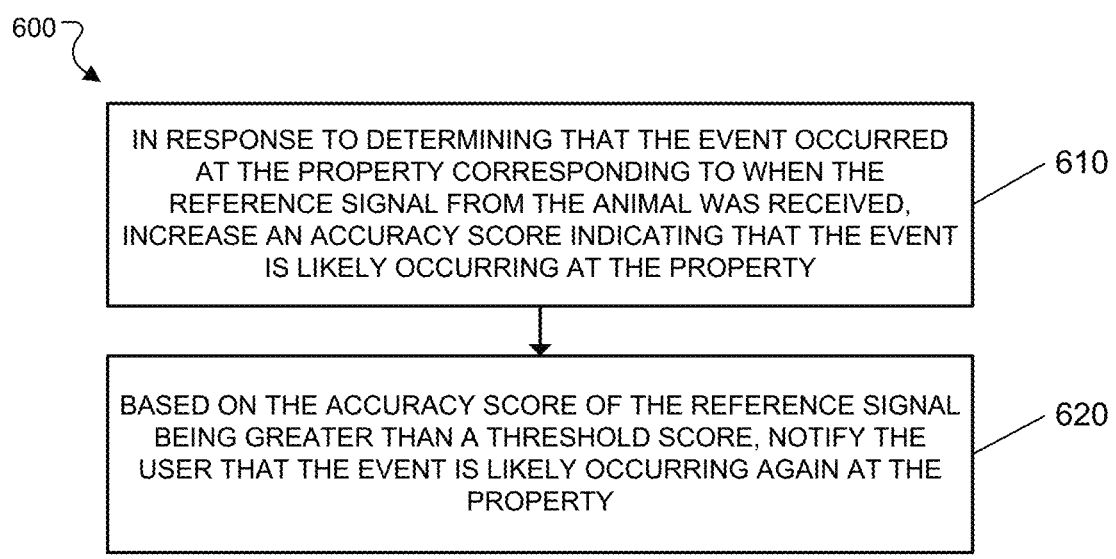
FIG. 6 illustrates an example processes of a canine assisted monitoring based on an accuracy score.

FIG. 6 illustrates an example process 600 of a canine assisted monitoring based on an accuracy score. Briefly, the process 600 may include, in response to determining that the event occurred at the property corresponding to when the reference signal from the animal was received, increasing an accuracy score indicating that the event is likely occurring at the property (610), and based on the accuracy score of the reference signal being greater than a threshold, notifying the user that the event is likely occurring again at the property (620).

In more detail, the process 600 may include, in response to determining that the event occurred at the property corresponding to when the reference signal from the animal was received, increasing an accuracy score indicating that the event is likely occurring at the property (610). In some implementations, the accuracy score may include a hit rate indicating a count of correct detection incidents with respect to a total incident count of obtaining the reference signal. The controller 112 may increase the hit rate in response to determining that the event occurred at the property corresponding to when the reference signal from the animal was received. For example, the controller 112 may increase the hit rate in response to determining that an unknown user was located at the property when the reference signal from the animal was received. That is, if the animal 10 outputs the reference signal (e.g., barks, motions, or postures) to an event occurred at the property 102, the controller 112 may increase a likelihood that the event is occurring again at the property 102 when the controller 112 detects a sample signal corresponding to the reference signal in the future.

Alternatively or in addition, the accuracy score may include a false alarm rate indicating a count of incorrect detection incidents with respect to the total incident count of obtaining the reference signal. In this case, the controller 112 may decrease the false alarm rate in response to determining that the event occurred at the property corresponding to when the reference signal from the animal was received.

The process 600 may include, based on the accuracy score of the reference signal being greater than a threshold score, notifying the user that the event is likely occurring again at the property (620). For example, the controller 112 may include various configurations based on the accuracy score. In one example, the controller 112 may determine whether to notify the user that the event is likely occurring again at the property 102 based on the accuracy score of the reference signal being greater than a threshold hit rate. The user may preset different threshold hit rates for different types of events. For example, the controller 112 may notify the user of a potential intruder approaching the property 102 if the accuracy core of the reference signal is over 50% while the controller 112 may notify the user of a known user approaching the property 102 if the accuracy score of the reference signal is over 80%. In some cases, the user may provide the controller 112 with a response to the notification, and the controller 112 may increase or decrease the accuracy score based on the response of the user indicating whether the event actually occurred when the animal reacted to the event.

Figure 7:
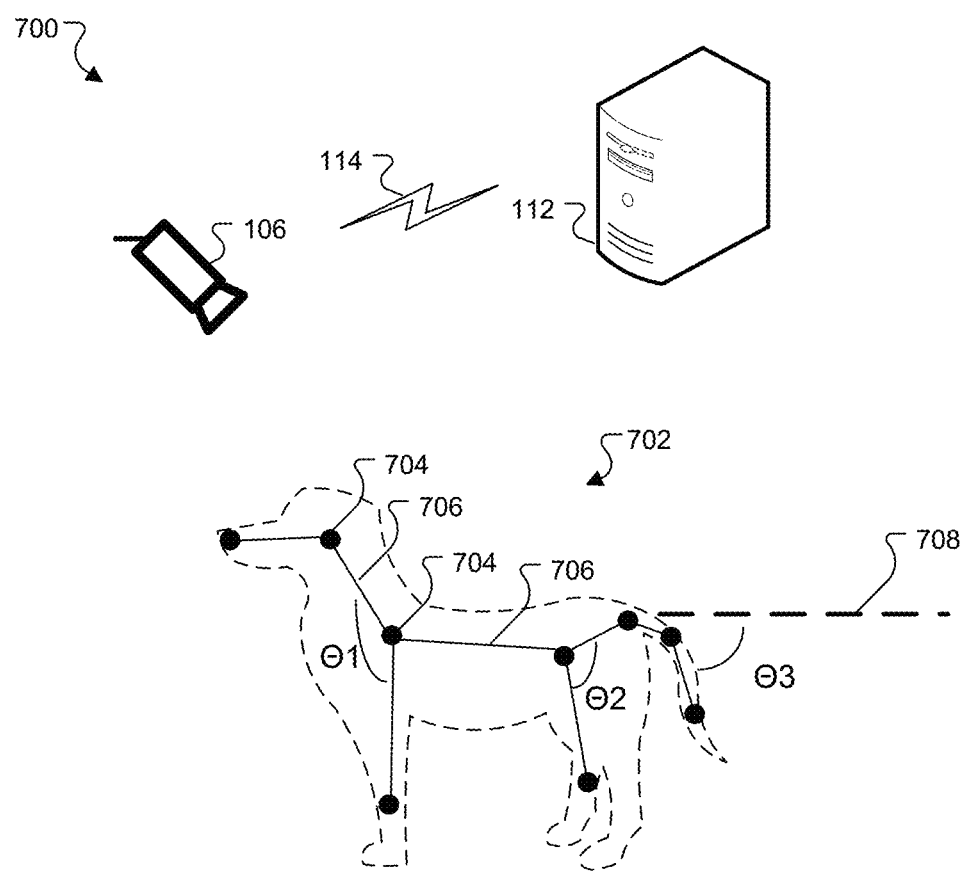
FIG. 7 illustrates an example skeletal model of an animal in a canine assisted monitoring.

FIG. 7 illustrates an example skeletal model of an animal in a canine assisted monitoring. A system 700 may include one or more of the components described in FIG. 1. For example, the system 700 may include an imaging sensor 106 and a controller 112 that communicates with the imaging sensor 106 through a communication link 114. The imaging sensor 106 captures images and videos of an animal, and the controller 112 may generate a model 702 that represents the animal based on the images and videos. For instance, the model 702 may include a skeletal model including nodes 704 and links 706 that connect the nodes 704. The controller 112 may use body tracking algorithms to generate the model 702 and analyze postures and motions of legs, body, head, and tail of the animal represented by one or more nodes 704 and one or more links 706. In some cases, the controller 112 may include a neural network that is configured to be trained to classify movements of the animal into classes relating to emotional states of the animal using the model 702.

In some examples, the controller 112 may determine orientations and postures of the animal using positions of the nodes 704 and relative angles (e.g., $\Theta1$, $\Theta2$) between links 706 or an angle $\Theta3$ with respect to a reference plane 708 (e.g., a horizontal plane, a vertical plane). The controller 112 may be trained to classify the determined postures of the animal to emotional states of the animal. In some cases, the controller 112 may determine motions of the animal using a speed or acceleration of the nodes 704 or an angular speed or acceleration of the angles (e.g., $\Theta1$, $\Theta2$, $\Theta3$). The controller 112 may be trained to classify motions of the animal determined based on the model 702 to various emotional states of the animal. For instance, the controller 112 may determine that the animal reacts to a known user if the angular speed of the angle $\theta3$ of a link representing a tail of the animal is greater than a reference angular speed.

In some implementations, the controller 112 may determine and compare (i) a first emotional state of the animal determined based on a motion of the animal and (ii) a second emotional state of the animal determined based on other sensor signals (e.g. a sound signal from the audio sensor 104 in FIG. 1). In this way, the controller 112 may fine-tune canine assisted monitoring methods or determine a better sensor signal that can detect a certain event with a higher accuracy score. For example, a motion of the animal may provide a higher accuracy score than a sound of the animal in detecting a known user, while the sound of the animal may provide a higher accuracy score than the motion of the animal in detecting an unknown user.

In some implementations, determining an emotional state of the animal may be optional to determine that an event is likely occurring again at the property. For instance, the controller 112 may be configured to, based on one or more sensor signals of the animal (e.g., sounds, postures, motions), directly determine that an event is likely occurring again at the property without necessarily determining emotional states of the animal corresponding to the sensor signals.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
   obtaining a first signal from an animal at a property;
   obtaining, from one or more sensors installed at the property, a sensor signal received when the first signal was received from the animal;
   determining, from the sensor signal, that an event occurred at the property when the first signal was received;
   in response to determining from the sensor signal that the event occurred at the property when the first signal was received, setting the first signal as a reference signal that indicates that the event is likely occurring at the property;
   obtaining a sample signal from the animal at the property after setting the first signal as the reference signal;
   determining whether the sample signal corresponds to the reference signal; and
   in response to determining that the sample signal corresponds to the reference signal, notifying a user that the event is likely occurring again at the property.

2. The method of claim 1, wherein determining whether the sample signal corresponds to the reference signal comprises:
   determining whether one or more of a pitch, duration, or number of peaks of a first sound represented by the sample signal match one or more of a pitch, duration, or number of peaks of a second sound represented by the reference signal.

3. The method of claim 1, wherein determining whether the sample signal corresponds to the reference signal comprises:
   determining whether movement of the animal shown in the reference signal matches movement of the animal shown in the sample signal.

4. The method of claim 1, wherein determining that the event occurred at the property comprises:
   based on the sensor signal, determining that an unknown user was located at the property when the first signal was received from the animal.

5. The method of claim 4, wherein setting the first signal as the reference signal comprises:
   based on determining, from the sensor signal, that the unknown user was located at the property when the first signal from the animal was received, determining that the first signal indicates that an unknown user is likely at the property.

6. The method of claim 1, further comprising:
   in response to determining that the sample signal corresponds to the reference signal, providing the sample signal from the animal to a speaker.

7. The method of claim 1, wherein obtaining the reference first signal from the animal at the property comprises:
   obtaining a signal from a sensor carried by the animal, the signal including at least one of an audio signal of the animal, location information of the animal, movement information of the animal, or an image or video of areas of the property captured by the sensor carried by the animal.

8. The method of claim 1, wherein determining whether the sample signal corresponds to the reference signal comprises:
   determining one or more reference parameters from the reference signal corresponding to emotions of the animal;
   comparing one or more parameters of the sample signal to the one or more reference parameters, respectively; and
   based on the comparison of the one or more parameters of the sample signal to the one or more reference parameters, respectively, determining whether the sample signal corresponds to the reference signal.

9. The method of claim 1, further comprising:
   determining a correlation value between the sample signal and the reference signal,
   wherein determining whether the sample signal corresponds to the reference signal comprises determining that the sample signal corresponds to the reference signal based on the correlation value being greater than a threshold value.

10. The method of claim 1, further comprising:
    in response to determining from the sensor signal that the event occurred at the property when the first signal was received, increasing an accuracy score indicating that the event is likely occurring at the property when the reference signal is received from the animal,
    wherein notifying the user that the event comprises:
       based on the accuracy score of the reference signal being greater than a threshold score, notifying the user that the event is likely occurring again at the property.

11. The method of claim 1, wherein obtaining the first signal from the animal at the property comprises:
    capturing a reference image of the animal when the sensor signal was received; and generating a body model of the animal in the reference image, the body model comprising a plurality of model points that respectively correspond to body parts of the animal.

12. The method of claim 1, wherein obtaining the first signal from the animal at the property comprises:
capturing a reference image of the animal when the sensor signal was received; and
determining a reference posture of the animal in the reference image, and
wherein determining whether the sample signal corresponds to the reference signal comprises:
capturing a sample image of the animal,
determining a sample posture of the animal in the sample image, and
comparing the sample posture of the animal to the reference posture of the animal in the reference image.

13. A system for canine assisted monitoring, comprising:
one or more sensors installed at a property and configured to detect one or more signals from an animal at the property;
one or more controllers configured to perform operations comprising:
obtaining a first signal from the animal at the property;
obtaining, from the one or more sensors installed at the property, a sensor signal received when the first signal was received from the animal;
determining, from the sensor signal, that an event occurred at the property when the first signal was received;
in response to determining from the sensor signal that the event occurred at the property when the first signal was received, setting the first signal as a reference signal that indicates that the event is likely occurring at the property;
obtaining a sample signal from the animal at the property after setting the first signal as the reference signal;
determining whether the sample signal corresponds to the reference signal; and
in response to determining that the sample signal corresponds to the reference signal, notifying a user that the event is likely occurring again at the property.

14. The system of claim 13, wherein determining whether the sample signal corresponds to the reference signal comprises:
determining whether one or more of a pitch, duration, or number of peaks of a first sound represented by the sample signal match one or more of a pitch, duration, or number of peaks of a second sound represented by the reference signal.

15. The system of claim 13, wherein determining whether the sample signal corresponds to the reference signal comprises:
determining whether movement of the animal shown in the reference signal matches movement of the animal shown in the sample signal.

16. The system of claim 13, wherein determining that the event occurred at the property comprises:
based on the sensor signal, determining that an unknown user was located at the property when the first signal was received from the animal.

17. The system of claim 13, wherein the operations further comprise:
in response to determining from the sensor signal that the event occurred at the property when the first signal was received, increasing an accuracy score indicating that the event is likely occurring at the property when the reference signal is received from the animal, and
wherein notifying the user that the event comprises:
based on the accuracy score of the reference signal being greater than a threshold score, notifying the user that the event is likely occurring again at the property.

18. At least one non-transitory computer-readable storage medium having stored thereon instructions which, when executed by at least one processor, cause performance of operations comprising:
obtaining a first signal from an animal at a property;
obtaining, from one or more sensors installed at the property, a sensor signal received when the first signal was received from the animal;
determining, from the sensor signal, that an event occurred at the property when the first signal was received;
in response to determining from the sensor signal that the event occurred at the property when the first signal was received, setting the first signal as a reference signal that indicates that the event is likely occurring at the property;
obtaining a sample signal from the animal at the property after setting the first signal as the reference signal;
determining whether the sample signal corresponds to the reference signal; and
in response to determining that the sample signal corresponds to the reference signal, notifying a user that the event is likely occurring again at the property.

19. The at least one non-transitory computer-readable storage medium of claim 18, wherein determining whether the sample signal corresponds to the reference signal comprises:
determining whether one or more of a pitch, duration, or number of peaks of a first sound represented by the sample signal match one or more of a pitch, duration, or number of peaks of a second sound represented by the reference signal.

20. The at least one non-transitory computer-readable storage medium of claim 18, wherein determining whether the sample signal corresponds to the reference signal comprises:
determining whether movement of the animal shown in the reference signal matches movement of the animal shown in the sample signal.

* * * * *

UNITED STATES PATENT AND TRADEMARK OFFICE
CERTIFICATE OF CORRECTION

PATENT NO. : 11,200,786 B1
APPLICATION NO. : 16/380291
DATED : December 14, 2021
INVENTOR(S) : Madden Page 1 of 1

It is certified that error appears in the above-identified patent and that said Letters Patent is hereby corrected as shown below:

In the Claims

In Claim 7, Column 26, Line 24, delete "the reference" and insert -- the --.

Signed and Sealed this
First Day of March, 2022

Drew Hirshfeld
*Performing the Functions and Duties of the*
*Under Secretary of Commerce for Intellectual Property and*
*Director of the United States Patent and Trademark Office*